United States Patent [19]

Kiefer

[11] Patent Number: 5,614,226

[45] Date of Patent: Mar. 25, 1997

[54] AUTO-VENTING FOR POLYURETHANE FOAM

[75] Inventor: Gerry D. Kiefer, Ellisville, Mo.

[73] Assignee: Atoma International Inc., Newmarket, Canada

[21] Appl. No.: 415,455

[22] Filed: Apr. 3, 1995

Related U.S. Application Data

[62] Division of Ser. No. 132,249, Oct. 6, 1993, Pat. No. 5,446,404.

[51] Int. Cl.$^6$ ................................................. B29C 44/60
[52] U.S. Cl. ........................ 425/112; 425/135; 425/150; 425/812
[58] Field of Search ..................... 425/4 R, 812, 425/135, 112, 150, 140; 264/40.1, 40.3, 40.4, 46.4, 46.6, 46.8, 51, 276, 408, 411

[56] References Cited

U.S. PATENT DOCUMENTS

| | | | |
|---|---|---|---|
| 3,023,713 | 3/1962 | Avila | 425/135 |
| 3,092,874 | 6/1963 | Fallwell | 425/135 |
| 4,025,372 | 5/1977 | Fenton | 264/46.8 |
| 4,479,914 | 10/1984 | Baumrucker | 264/40.3 |
| 4,538,666 | 9/1985 | Takeshima et al. | 425/812 |
| 4,721,279 | 1/1988 | Oleszko et al. | 425/812 |
| 4,721,590 | 1/1988 | Trapp | 425/153 |
| 4,787,436 | 11/1988 | Ozeki et al. | 425/812 |
| 4,909,972 | 3/1990 | Britz | 264/40.1 |
| 4,923,653 | 5/1990 | Matsuura et al. | 264/40.3 |
| 4,946,363 | 8/1990 | Cavender | 425/812 |
| 4,959,184 | 9/1990 | Akai et al. | 264/40.3 |
| 4,976,614 | 12/1990 | Yanagishita | 264/40.3 |
| 4,988,282 | 1/1991 | Fukui | 425/4 R |
| 5,039,291 | 8/1991 | Iwasawa et al. | 425/4 R |
| 5,098,270 | 3/1992 | Rohn | 425/117 |
| 5,107,576 | 4/1992 | Rohn | 29/91.1 |
| 5,110,085 | 5/1992 | Iwasawa | 425/812 |
| 5,256,580 | 10/1994 | Clark et al. | 264/296 |

FOREIGN PATENT DOCUMENTS

| | | | |
|---|---|---|---|
| 461522 | 12/1991 | European Pat. Off. | 425/812 |
| 60-90729 | 5/1985 | Japan | 264/40.3 |
| 62-174135 | 7/1987 | Japan | 264/40.3 |

*Primary Examiner*—Jan H. Silbaugh
*Assistant Examiner*—Vi Duong Dang
*Attorney, Agent, or Firm*—Cushman, Darby & Cushman

[57] ABSTRACT

A device for molding foam products including upper and lower portions cooperable to form a foam mold defining a mold cavity therein. The upper mold portion has at least one vent hole therein. A mechanism for providing the mold cavity with an expandable foam during a filling cycle is also provided. The expandable foam reactively expands when provided within the cavity so as to be molded into the shape of the cavity during a foaming cycle. The foam approaches the vent hole while expanding within the mold cavity during the foaming cycle. At least one vent hole provides a passage through which air and reaction product gases introduced into the cavity as a byproduct of the reactive expanding of the foam can escape to atmosphere from the cavity during the foaming cycle. A sensing and signal generating assembly detects the presence of the foam at a predetermined proximity to the at least one vent hole during the foaming cycle and generates a signal in response to the detection. Finally, a sealing mechanism cooperates with the at least one vent hole to close the passage when the sensing and signal generating assembly generates the signal in response to the detection of the foam at the predetermined proximity to the at least one vent hole to prevent the foam approaching the vent hole from escaping the cavity through the passage.

11 Claims, 6 Drawing Sheets

AUTO-VENTING FOR POLYURETHANE FOAM

This is a division of application Ser. No. 08/132,249, filed Oct. 6, 1993 U.S. Pat. No. 5,466,404.

DESCRIPTION OF INVENTION

This invention generally relates to a mold used in forming or manufacturing a foamed product. More particularly, it relates to a venting device capable of sufficiently exhausting air and reaction product gases in a cavity of a foam mold while effectively preventing an expanding foamable material from escaping from the foam mold to atmosphere.

Hitherto used devices for manufacturing molded products have been disclosed, for example, in U.S. Pat. No. 5,098,270 and U.S. Pat. No. 5,107,576. Such patents relate to foam molds used in the manufacture of automobile seats. Typically, a bottom mold half is provided into which an expandable foamable material is poured. The bottom mold half is then covered with an upper mold half to form a foam mold defining a mold cavity therein. The expandable foamable material, while curing (usually during a heating process), expands within the mold cavity so as to take the shape thereof. While it has not been disclosed in the aforementioned patents, the upper mold half is oftentimes provided with at least one vent hole therein that provides a passage through which air and reaction product gases introduced into the cavity as a byproduct of the curing process can escape from the cavity after the lower mold half is covered with the upper mold half. It can be appreciated that, if vent holes are not provided within the cavity, air and reactive gas pressure within the cavity will increase as the expanding foam rises towards the upper mold half of the foam mold as a result of the increase in amount of gas and the decrease in amount of available space above the foamable material within the cavity. Such pressure build-up will act against the rising foam to (1) prevent the foam from effectively taking the shape of the mold cavity and (2) cause the foamable material to be more dense than desired. The increase in density causes a greater amount of foamable material to be incorporated into each foamed product than otherwise required. This, of course, increases manufacturing costs.

While vent holes in the foam molds of the prior art allow gases to vent, the prior art is problematic in that the expandable foamable material is permitted to expand unimpededly into the vent holes and eventually escape the cavity therethrough. Although the rising foam eventually solidifies after escaping through each of the vent holes to thereby prevent even further escape of expandable foamable material, the solidified portions (which takes the shape of mushrooms—see FIG. 10) that protrude through the vent holes must be removed from the final molded product before the product is removed from the foam mold. The aforementioned mushrooms must be removed for a number of reasons. Not only are the mushrooms undesirable from an aesthetic or geometric standpoint of the finished product, but, in effect, it becomes virtually impossible to remove the foam product from the foam mold with the mushrooms in place as the cap portion of the mushrooms serve to lock the finished foamed product to the mold.

The removal of mushrooms is normally accomplished manually, by a picking process or the like, and requires a significant number of man-hours when numerous foamed products are manufactured. In addition, the aforementioned removal process causes a significant amount of waste of foamable material. Both of these factors significantly increase manufacturing costs. Thus, there exists a need for a device which will effectively reduce or eliminate the man-hours required to remove the excess foamable material that protrudes from foam molding device vent holes. There also exists a need to reduce or eliminate the waste of foamable material which results from the foamable material escaping the foam mold through vent holes therein.

It is an object of the present invention to fulfill the need expressed above in an efficient and inexpensive manner. In accordance with the principles of the present invention, this objective is achieved by providing a device for molding foam products comprising a plurality of mold portions cooperable to form a foam mold assembly defining a mold cavity therein having at least one vent hole in an upper portion thereof. The mold cavity is capable of having an expandable foamable material provided therein during a filling cycle which reactively expands within the cavity so as to be molded into the shape of the cavity during a foaming cycle. The foam approaches the vent hole while expanding within the mold cavity during the foaming cycle. The at least one vent hole provides a passage through which air and reaction product gases introduced into the cavity as a byproduct of the reactive expanding of the foam can escape to atmosphere from the cavity during the foaming cycle. A sensing and signal generating assembly detects the presence of the foam at a predetermined proximity to the at least one vent hole during the foaming cycle and generates a signal in response to the detection. Finally, a sealing mechanism cooperates with the at least one vent hole to close the passage when the sensing and signal generating assembly generates the signal in response to the detection of the foam at the predetermined proximity to the at least one vent hole to prevent the foam approaching the vent hole from escaping the cavity through the passage.

It is another object of the present invention to provide a method for molding foamed products comprising the steps of providing a plurality of mold portions cooperable to form a foam mold defining a mold cavity therein having at least one vent hole in the upper portion thereof, providing the mold cavity with an expandable foamable material during a filling cycle, reactively expanding the expandable foamable material within the mold cavity so as to be molded into the shape of the mold cavity during a foaming cycle, the expandable foamable material approaching the vent hole while expanding within the mold cavity during said foaming cycle and the at least one vent hole providing a passage through which air and reaction product gases introduced into the mold cavity as a byproduct of the reactive expanding of the expandable foamable material can escape to atmosphere from the mold cavity during the foaming cycle, sensing the presence of the expandable foamable material at a predetermined proximity to the at least one vent hole during the foaming cycle, generating a signal when the presence of the expandable foamable material is sensed at the predetermined proximity to the at least one vent hole, and sealing the at least one vent hole to close the passage when the signal is generated when the presence of the expandable foamable material is sensed at the predetermined proximity to the at least one vent hole to prevent the expandable foamable material approaching the at least one vent hole from escaping the mold cavity through the passage.

The invention will be more fully understood by referring to the following detailed specification and claims taken in connection with the following drawings.

While the molding device of the present invention can be used to mold any product made of a foamable material, such as a simple foam pad, it is herein described in relation to the manufacture of automobile seats and seat backs in accordance with the process as described in U.S. Pat. No. 5,107,576. The process of the patent is one in which the foam pad is formed within an inner mold while a cover structure is held by a cooperating lower vacuum mold. The principles of the present invention would have applicability in other vehicle seat making processes. In other processes, the foam pad is made separately and then covered by a cover. In some processes, the separately made foam pad is adhesively adhered to the cover to form an integral unit which is then mounted on the frame. In the more conventional methods, the pads are fitting on the frame and covered manually. In all of these processes, the features of the present invention are used in molding the foam pad. Since the molding of the foam pad is an integral part of the presently preferred process of producing an integrated pad and cover the entire process will be described in detail including first the seat back which is more difficult and then the seat cushion.

Figure 1:
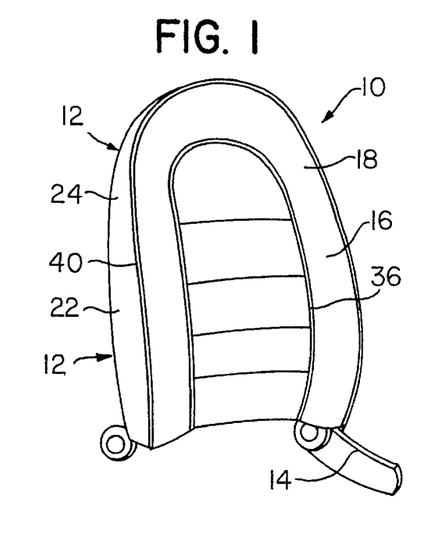
FIG. 1 is a perspective view of an automotive seat back which includes therein the foamable material manufactured by the method and device of the present invention.

Referring now more particularly to the drawings, there is shown in FIG. 1 a seat back, generally indicated at 10. As shown, the seat back 10 includes a cover in the form of an exterior bag-like structure, generally indicated at 12, which extends over an interior frame 14 suitably secured to the frame of the seat bottom (not shown) in accordance with conventional practice.

The bag-like structure 12 includes a front panel 16 presenting an exterior surface 18 at the front of the interior frame 14 and an opposite interior surface 20 and a back panel 22 presenting an exterior surface 24 at the back of the interior frame 14 and an opposite interior surface 26. A body of foamable material 28 is fixed to the interior surface 20 of the front panel in a position forwardly of the interior frame 14.

Figure 2:
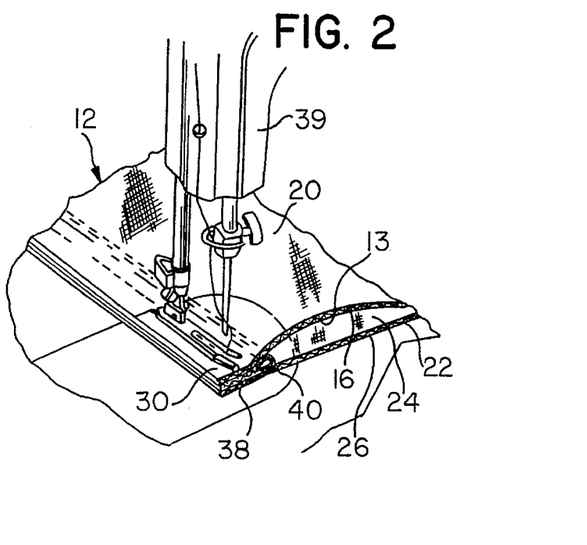
FIGS. 2, 3, 4 and 5 are pictorial views illustrating the first three successive steps of manufacturing the automotive seat back of FIG. 1.

FIG. 2 illustrates a procedure undertaken in an initial step of making the seat back 10. As shown, the bag-like structure 12 consists essentially of the front panel 16 and back panel 22. The front panel 16 is of two-piece construction including an inverted U-shaped outer piece of material providing an outer inverted U-shaped marginal edge 30 and an inner inverted U-shaped marginal edge 32. As can be seen from FIG. 7, the inner marginal edge 32 is sewn to a marginal edge 34 of a central piece of material forming the second piece of the two-piece front panel 16. It will be understood that the front panel may be formed of one piece or more than two pieces of any suitable material, the two-piece construction being merely exemplary.

While the marginal edges 30 and 32 may be secured together in any known fashion, the sewn seam is preferred since this mode of connection is utilized between the front panel 16 and the back panel 22. The sewn seam between the edges 32 and 34 is made so that the stitches are exterior of the interior surface 20 of each front panel piece. In the embodiment shown, a welting strip 36 is sewn between the marginal edges 30 and 32 so that the welting is exposed on the exterior surface 18 of the front panel 16.

FIG. 2 specifically illustrates the sewing of the outer inverted U-shaped marginal edge 30 of the front panel 16 to an outer inverted U-shaped marginal edge 38 of the back panel 22. The seam between the marginal edges 30 and 38 of the two panels is made on a conventional sewing machine 39 so that the exterior of the stitches are on the interior surface 20 and 26 of the two panels 16 and 22. Preferably, a welting strip 40 is sewn between the marginal edges 30 and 38 so that the welting shows exteriorly along with the exterior surfaces 18 and 24 of the panels 16 and 22.

It will be noted that the bag-like structure 12 is completed by completing the sewing seam between the marginal edges 30 and 38 and welting strip 40 so that the resultant bag-like structure is completed in a condition wherein the exterior surfaces 18 and 24 of the front and back panels 16 and 22 are disposed in facing relation with respect to one another and the interior surfaces 20 and 26 of the front and back panels face away from one another. The bag-like structure 12 can be made of any desired material. It is common practice to employ a laminate as the material. Typically, an outer layer of a porous textile material is used with an inner layer of sheet foam. These materials are porous and it is possible to utilize non-porous materials such as sheet vinyl. Where porous materials are utilized, the interior of at least the panel portion of the structure on which the pad is to be formed must be rendered imperforate. This can be done by including a plastic film layer on the interior surface of the foam sheet and taping the panel seams as disclosed in commonly assigned application Ser. No. 728,690, issued as U.S. Pat. No. 5,231,745, or by subsequently mounting a plastic film on the interior panel surface in accordance with the disclosure of commonly assigned concurrently filed application, Ser. No. 08/203,352, which issued as U.S. Pat. No. 5,468,433.

Figure 3:
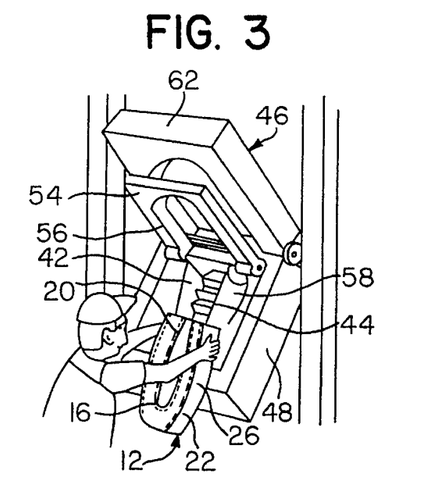

FIG. 3 pictorially represents the next step in the manufacture of the automobile seat back, which is the step of sliding the bag-like structure 12 onto a tongue-like mold 42 while the bag-like structure 12 is in the condition in which the panels 16 and 22 thereof were sewn together and without inverting the same or if inverted for any reason reinverting the same so as to bring the exterior surface 18 of the front panel 16 into face-to-face relation with a mold surface 44 of the tongue-like mold 42.

As shown, the tongue-like mold 42 forms one part of a mold assembly, generally indicated at 46, which includes a lower mold portion 48 on which the tongue-like mold 42 is pivotally mounted for movement between a bag-engaging and removing position as shown in FIG. 3, and an operative position as shown in FIGS. 4–8. The mold surface 44 has a configuration which conforms with the exterior configuration of the seat back 10 when completed. The tongue-like mold 42 also includes a vacuum system 50 which extends to the mold surface through a series of openings 52. The mold assembly 46 also includes a peripheral foaming mold 54 which is pivoted to the lower mold portion 48 so as to be moved between an inoperative position, such as shown in FIG. 3, which permits the bag-like structure 12 to be inserted on the tongue-like mold 42, and an operative position, such as shown in FIGS. 4–8, wherein a peripheral edge 56 of the peripheral foaming mold 54 cooperates with a peripheral edge 58 of the tongue-like mold 42 to control the movement of the peripheral portion of the front panel 16 therebetween, which movement is stopped by the engagement of the welting strip 40 of the front panel—back panel seam with the peripheral edges 56 and 58.

Figure 4:
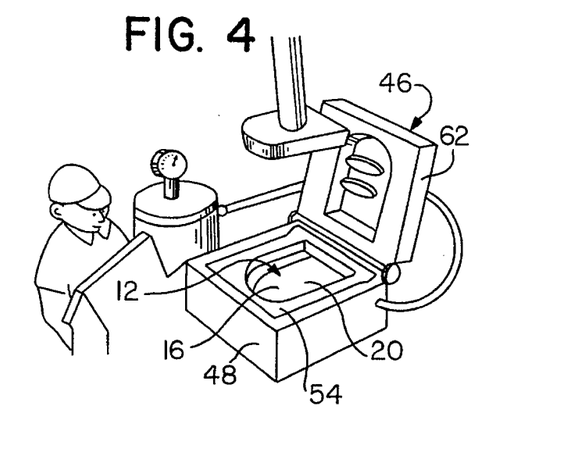

FIG. 4 illustrates the next step which is to facilitate the engagement of the front panel 16 with the mold surface 44, if necessary, by lowering a pad or plug assembly 60 through the peripheral mold 54 into the upwardly exposed interior surface 20 of the front panel 16 to move appropriate sections of the front panel 16 into positions of engagement with appropriate sections of the mold surface 44. When the pad assembly has reached its operative position, the vacuum system 50 is energized to fully engage the entire exterior surface 18 of the front panel 16 with the mold surface 44, which in accordance with the principles enunciated in U.S. Pat. No. 5,098,270, may result in the stretching of sections of the front panel depending upon the stopping action provided by the welting strip 40 seam. Once the front panel 16 is in engagement with the mold surface 44, the configuration of the exterior surface 18 of the front panel 16 is in conformity with the shape it will finally assume, but the vacuum does not set the configuration. The setting is accomplished in future steps.

The use of the pad assembly 60 is style dependent. Where the concavity of the mold surface 44 does not include central flats, vacuum alone is sufficient to effect conformity. Where flats are presented, the pad assembly 60 is utilized. Where plural flats are provided, the pad assembly includes plural pads which may be sequentially engaged.

Figure 5:
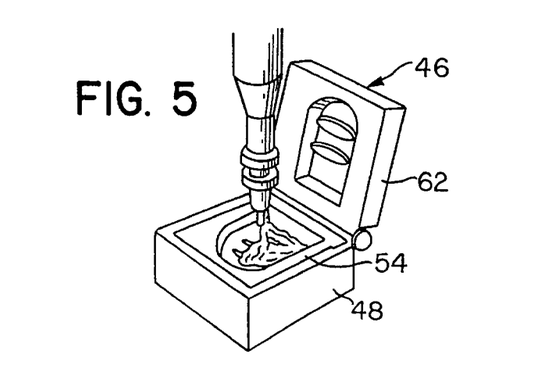

FIG. 5 illustrates the next step in the process of the present invention which is to feed into the open peripheral foaming mold 54 and onto the interior surface 20 of the front panel 16 an amount of heat foamable and curable material which will fill the peripheral frame when closed by upper mold portion 62 forming a final part of the mold assembly 46. As shown, the upper mold portion 62 is pivoted to the lower mold portion 48 between an open position, such as shown in FIGS. 3–5 permitting the foamable material to be added, and a closed position, such as shown in FIGS. 6 and 7 wherein the cooperating peripheral foaming mold 54 is further compressed into engagement with the interior surface 20 of the front panel.

Figure 6:
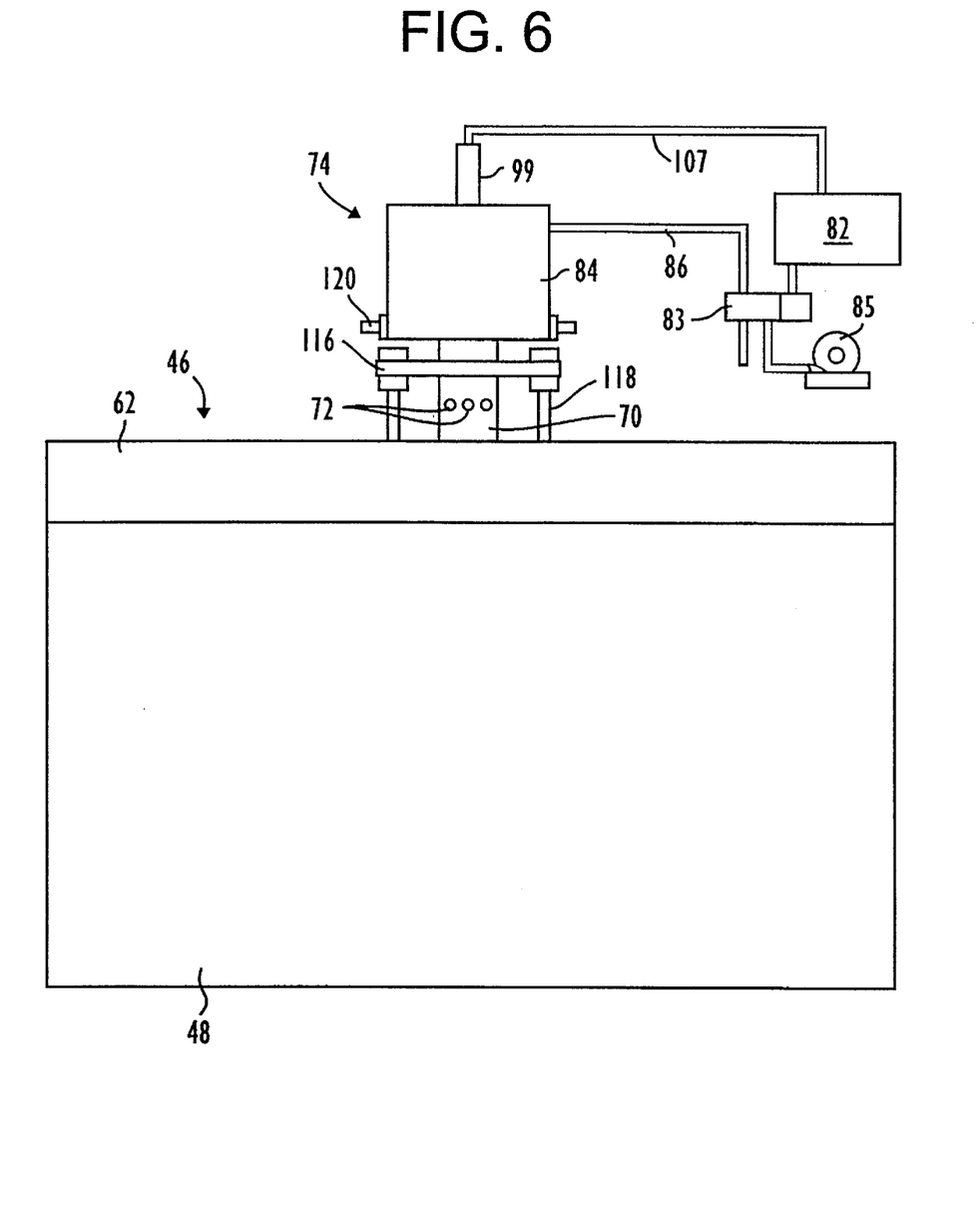
FIG. 6 is a front elevational view of an embodiment of a molding device, embodying the principles of the present invention which is used in making the seat back shown in FIG. 1.
Figure 7:
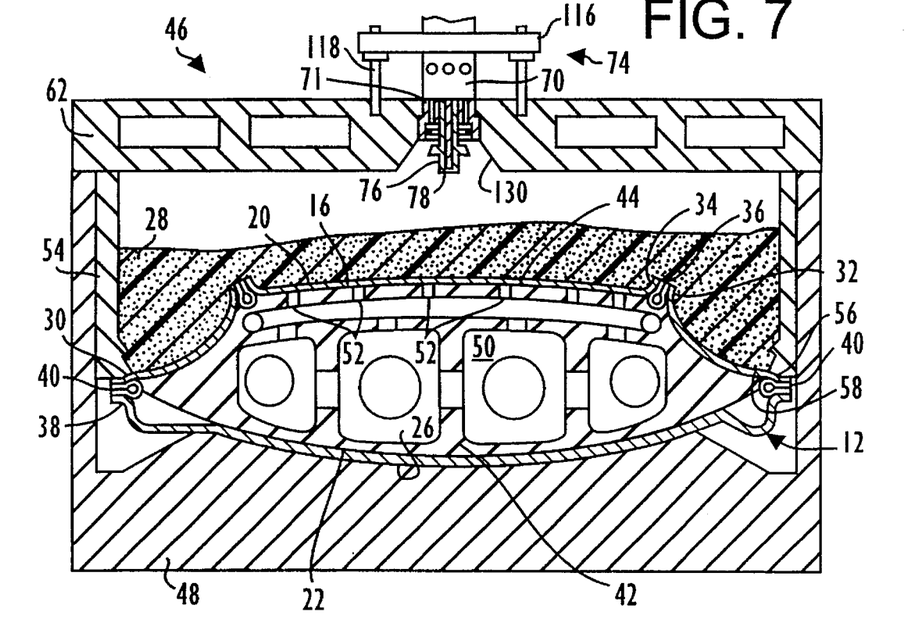
FIG. 7 is a vertical sectional view of the molding device shown in FIG. 6 in a venting stage.
Figure 8:
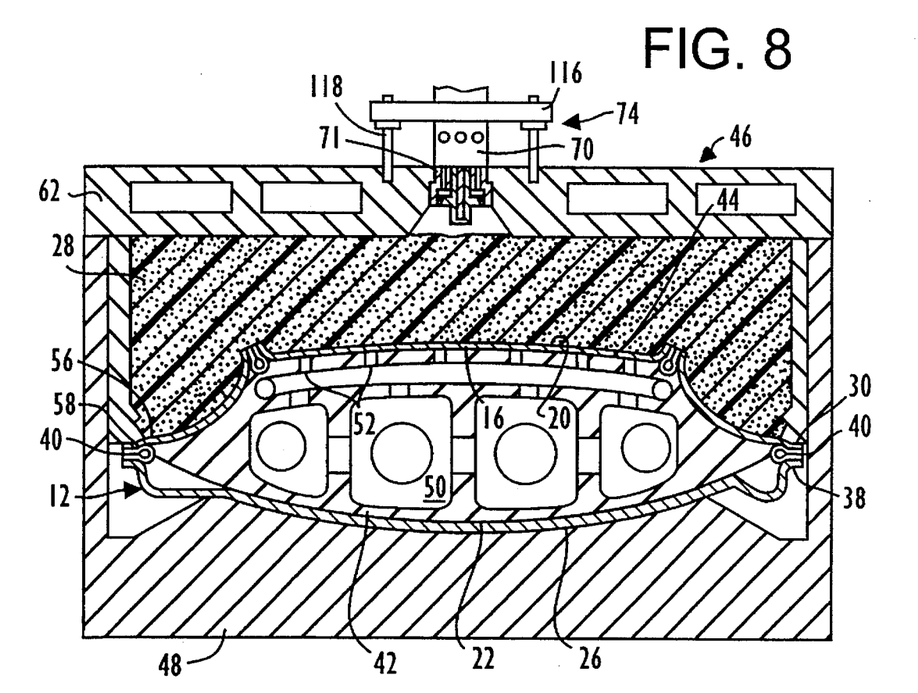
FIG. 8 is a sectional view similar to FIG. 7 showing the molding device in a sealed stage.

FIGS. 6–8 illustrate the next step in the process of the present invention which is to close upper mold portion 62 and to cure the foamable material by heating so that it foams and rises to fill the space defined by the upwardly facing interior surface 20 of the front panel 16, the interior peripheral surface of the peripheral mold 54, and the downwardly facing surface of the closure mold 62.

As shown, the venting device of the present invention, generally indicated at 74, comprises a hollow cylindrical tube 70, preferably made of stainless steel, which extends outwardly from the upper mold portion 62 and provides a means by which air and reaction product gases within mold assembly are permitted to escape when the mold assembly is in its closed position. Exhaust ports 72 within tube 70 provide such passage for gases to escape during the curing process.

Figure 9:
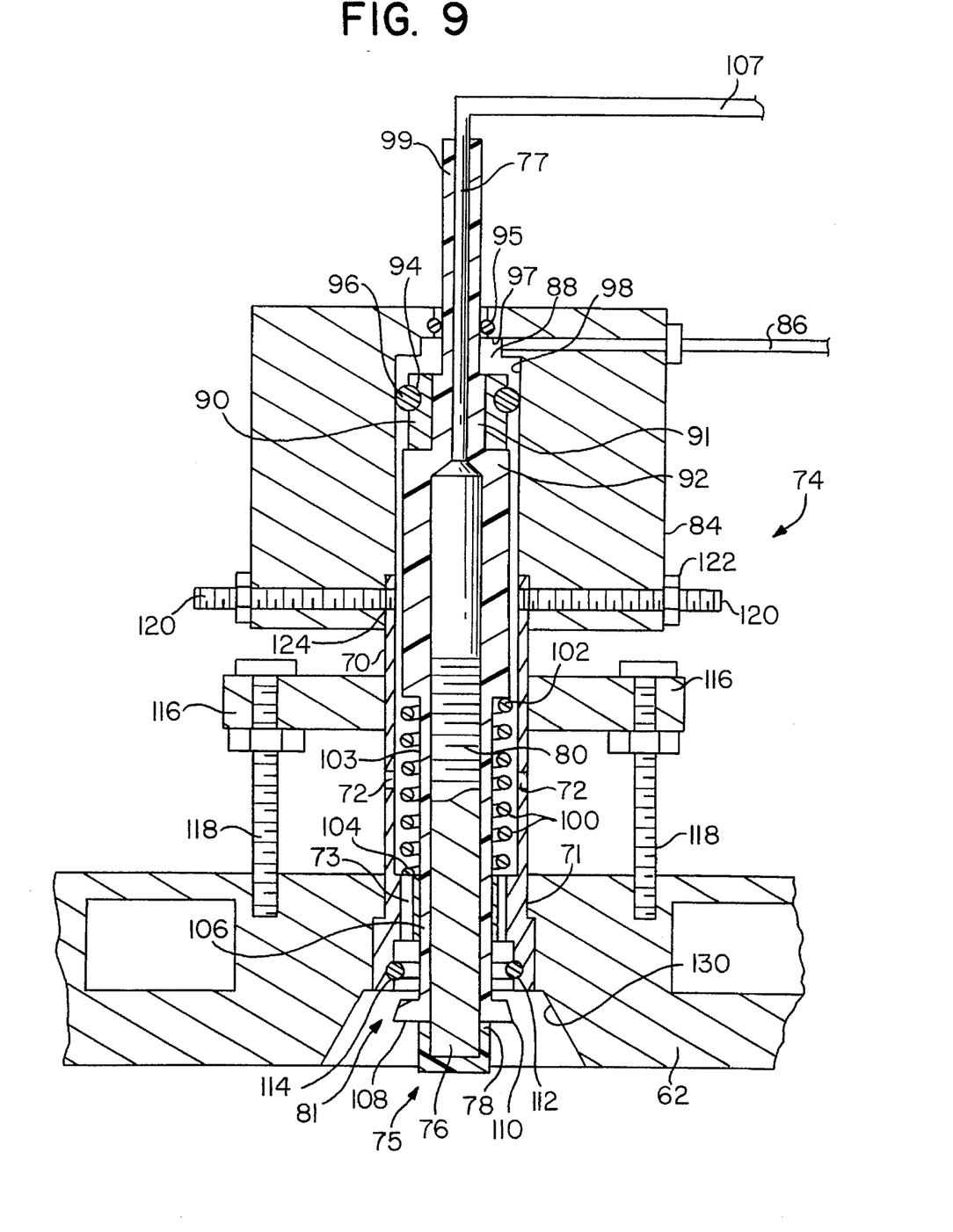
FIG. 9 is an enlarged sectional view of the sensing and signal generating assembly and sealing mechanism embodying the principles of the present invention utilized in the molding device of FIGS. 7 and 8.

FIG. 7 shows a cross sectional view of the molding device after upper mold portion 62 has recently been-pivoted into the closed position on lower mold portion 48. This depicts the beginning of the curing process wherein mold assembly 46 is heated to cause foamable material 28 to rise therein. As foamable material 28 approaches upper mold portion 62, air and other reactive byproduct gases of the curing process are permitted to climb into hollow cylindrical tube 70 and escape through exhaust ports 72, as shown in FIG. 9.

In FIGS. 6–9, there is shown that a sensing and signal generating assembly, generally indicated at 75, is provided which includes a capacitive sensor 76, substantially cylindrical in shape with a narrowed diameter portion 77 and a lower threaded portion 80, extends through the upper and lower ends of tube 70 and slightly into the cavity created by upper mold portion 62 and lower mold portion 48. Capacitive sensor 76 is of the type, such as that manufactured by Pepperl + Fuchs Incorporated of Twinsburg, Ohio, model number CJ4-12GK-N. Such capacitive sensors have a high frequency oscillator with one of the capacitor plates built into the end of the sensor. Sensing is determined by a change in dielectric characteristics as it relates to air. Nominal sensing ranges are calculated relative to the water content in the foamable material 28, and the size, shape, and configuration of threaded protective end cap 78 which is screwed onto the end of threaded portion 80 of capacitive sensor 76.

The sensor 76 creates approximately a 4 millimeter electric field around the tip thereof. As with any capacitor, the plate size, or in this case the protective cap, determines the sensing range and shape of the dome. Nylon and lexan materials are currently used for the above mentioned protective end cap 78. Nylon provides a low amplification while lexan provides a high amplification.

The sensing and signal generating assembly 75 is operatively connected to control a vent sealing mechanism generally indicated at 81, which as shown is preferably power operated by any suitable means such as an under pressure. When foamable material 28 has not yet fully expanded to completely fill the cavity within mold assembly 46 (see FIG. 7), an appropriate electrical signal is provided by capacitive sensor 76 to control box 82, which in turn operates a valve, such as electrically operated three-way valve 83, to provide pressure from an air supply, such as pump 85, into main block 84 through air supply hose 86. The air pressure is maintained within inner air space 88 of main block 84 so as to exert a force upon piston 90 which is an annular aluminum ring press fit onto first upper narrowed diameter portion 91 of threaded nylon sleeve 92. Nylon sleeve 92 is threadedly secured to threaded portion 80 of capacitive sensor 76. Piston 90 comprises a circumferential 0-ring seat 94 on its exterior surface. 0-ring 96 is disposed within 0-ring seat 94 so as to allow piston 90 to be in slidably sealed relation with interior surface 98 of main block 84 defining a cylindrical chamber for the piston. A circumferential 0-ring seat 95 is disposed in the upper extremity of main block 84. 0-ring 97 is disposed with 0-ring seat 95 and is in slidably sealed relation with second upper narrowed diameter portion 99 of nylon locator sleeve 92 and maintains the pressure created within air space 88. Narrowed diameter portion 99 extends upwardly outwards from main block 84.

A coil spring 100 is disposed within tube 70 and circumferentially surrounds a portion of capacitive sensor 76 and narrowed diameter portion 103 of nylon locator sleeve 92 at the lower end thereof. The air pressure within air space 88 biases piston 90 downwardly or in an outwardly expanding direction from air space 88 so as to cause nylon locator sleeve 92 to maintain coil spring 100 in a compressed condition between radially extending downwardly facing shoulder 102 of nylon locator sleeve 92 and inwardly extending face 104 of tube 70.

When capacitive sensor 76 detects the presence of the rising foamable material 28 at a predetermined proximity thereto, capacitive sensor 76 sends an appropriate electrical signal through wires 107 leading to control box 82. In response to the electrical signal, control box 82 changes the electrical bias of three-way valve 83 so as to move it into a position to close off the air supply from the pump 85 and communicate air line 86 to atmosphere.

When the pressure of the air in air space 88 is reduced, pressurized forces no longer act on piston 90 to drive the capacitive sensor 76 and nylon locator sleeve 92 downwards, and coil spring 100 is able to bias these components in an upwards direction.

Threaded nylon seal cap 106 is in the form of a sleeve which is threadedly secured to capacitive sensor 76 between nylon locator sleeve 92 and protective end cap 78. The lowermost extremity of threaded nylon seal cap 106 has a radially extending portion 108 having a substantially frustoconical configuration with outer sloping face 110. An 0-ring 112 is annularly disposed within the lower portion of tube 70 in a 0-ring seat 114 thereof. It can be appreciated, as shown in FIG. 8, that when coil spring 100 forces nylon locator sleeve 92 along with capacitive sensor 76 in an upwards direction, sloping face 110 cooperates with O-ring 112 to form an airtight seal therebetween. This seal prevents rising foamable material 28 from escaping mold assembly 46 through vent hole 71 in upper mold portion 62 via passages 73 and exhaust ports 72 in tube 70.

Support ring 116 and bolt members 118 are provided to support tube 70 in its position relative to upper mold portion 62, as shown in FIGS. 7 and 8. In addition, set screws 120 extend through main block 84 and are held in place by locking nuts 122. The forward end of set screws 120 protrude through orifices 124 in the upper end of stainless steel tube 70 to properly position and secure the tube relative to main block 84.

Figure 10:
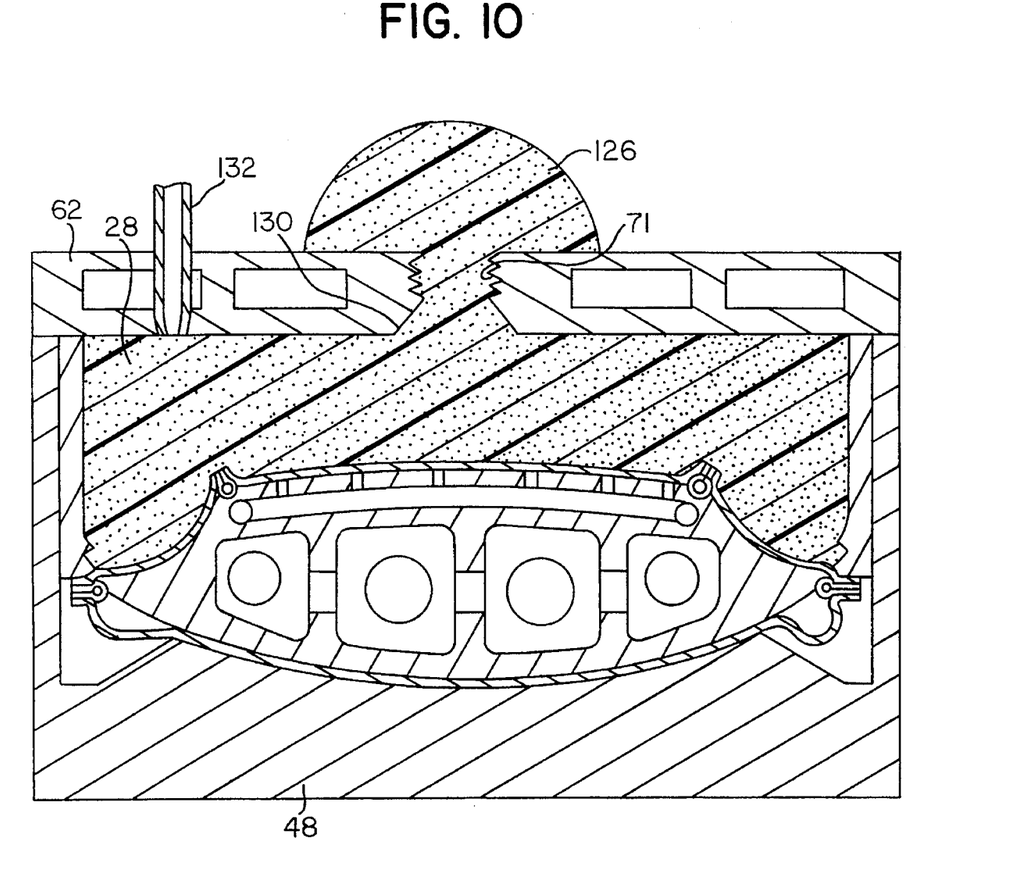
FIG. 10 is a sectional view similar to FIGS. 7 and 8 of the molding device of the present invention showing the expansion stage without the sensing and signal generating assembly and sealing mechanism as in the prior art.

FIG. 10 illustrates the effect of rising foamable material 28 in the instance in which a means to seal vent hole 71 is not provided. As shown, mushroom cap 126 is formed which must be removed in order to dislodge foamable material 28 from upper mold portion 62. Such removal of mushroom caps is a time consuming and tedious process which wastes foamable material. Formation of such mushroom caps 126 is avoided in accordance with the present invention. The effect is to reduce the number of man-hours required to produce a foamed material such as that provided in the seat of an automobile and to reduce the amount of foamable material wasted.

FIG. 10 also shows that an alternative method of feeding foamable material to the mold assembly 46 which is to do so after upper mold portion 62 is pivoted to the closed position. This can be accomplished through a conduit through the mold assembly such as conduit 132, which is connected to a foam source, through upper mold portion 62 as shown in FIG. 10.

It will be appreciated that vent holes 71 should be provided at the uppermost portion of the mold assembly 46 so as to allow gases to easily escape therefrom. Therefore, while vent holes 71 might be provided in lower mold portion 48, it is preferred that vent holes 71 be provided in upper mold portion 62 wherein a wide mouthed portion 130 is further provided leading to vent hole 71.

Figures 11, 12, 13:
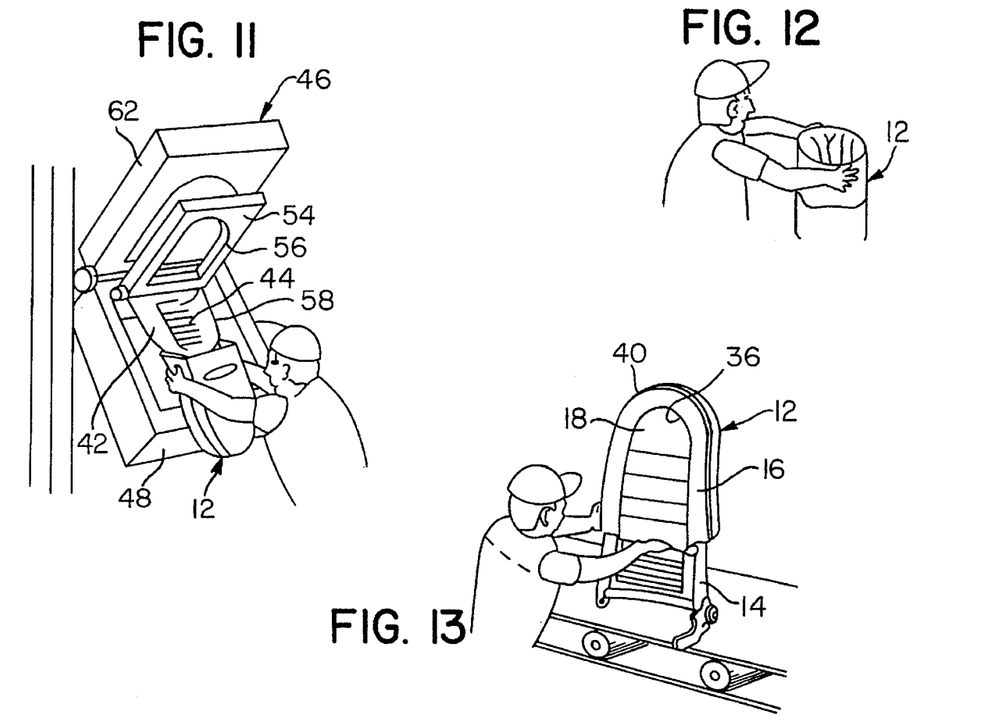
FIGS. 11, 12, and 13 are pictorial views similar to FIGS. 2–5 illustrating the last three successive steps of manufacturing the automotive seat back of FIG. 1.

FIG. 11 illustrates the next step in the process which is to move the closure mold 62 from its operative position into its inoperative position and then the peripheral mold 54 from its operative position into its inoperative position and finally the tongue-like mold 42 into its bag receiving and removing position. Next, the operator removes the bag-like structure 12 with the body of foamable material 28 integrally attached to the interior surface 20 of the front panel 16 thereof.

FIG. 12 illustrates the next step in the process which is to invert the bag-like structure 12 with the integral body of foamable material 28 thereof so that the exterior surfaces 18 and 24 of the panels 16 and 22 are disposed exteriorly thereof and face generally in opposite directions and the interior surfaces 20 and 26 of the panels 16 and 22 and the body of foamable material 28 are disposed interiorly thereof.

FIG. 13 illustrates a final step in manufacturing the above automobile seat wherein the inverted bag-like structure 12 with the body of foamable material 28 adhered to the interior surface 20 of the front panel 16 is mounted over the frame 14 of the seat back 10. The lower edges are suitably affixed under the bottom of the frame 14 to complete the assembly of the seat back 10.

Figure 14:
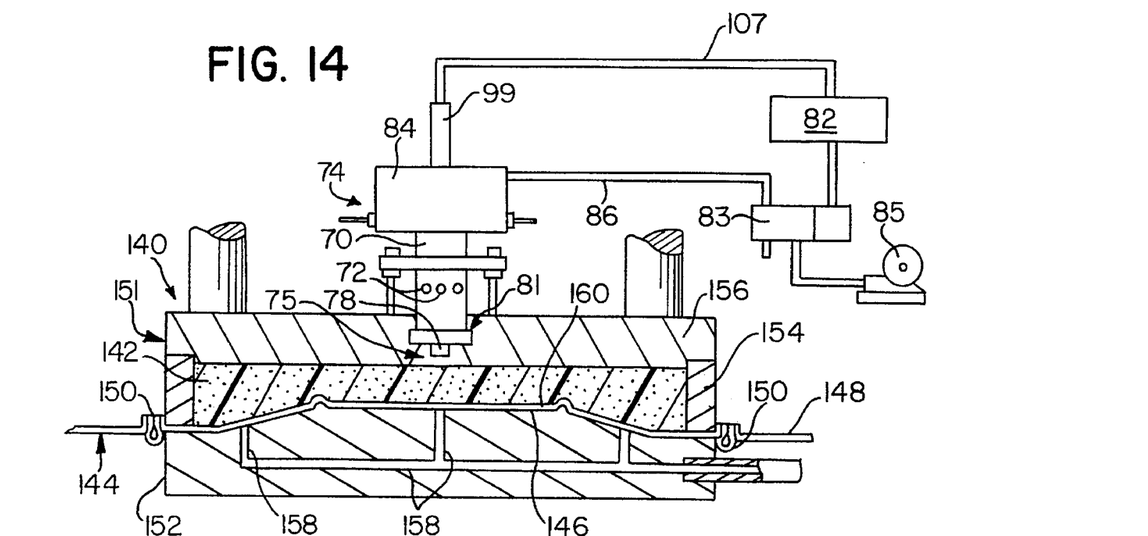
FIG. 14 is a view similar to FIG. 8 showing another embodiment of a molding device embodying the principles of the present invention which is used in making a seat cushion component.

Referring now more particularly to FIG. 14, there is shown therein a modified form of molding device, generally indicated at 140, which embodies the principles of the present invention and is utilized in molding a foam cushion 142 onto a cover, generally indicated at 144, in the manner similar to the method previously described except that the cover 144 and cushion 142 are for a vehicle seat rather than a seat back. Basically, the same process is utilized with variations relating to the particular configuration of the seat cover 144 and cushion 142. The seat cover 144 includes a main seat panel 146 and a skirt 148 which is sewn to the periphery of the seat panel 146 by a seam including welting strip 150. The seat panel 146 on which the cushion 142 is formed is therefore directly opposite an opening in the cover 144 in contrast with the seat back cover 12 in which the panel 16 which receives the cushion 28 is opposed by a back panel. Because of this difference, the cover 144 can be handled quite readily so as to obtain access to either surface of the seat panel 146 and the use of a tongue-like mold part is not necessary.

As shown in FIG. 14, a mold assembly, generally indicated at 151, is utilized which includes a lower vacuum mold part 152, a peripheral mold part 154, and an upper mold part 156. As before, the lower mold part 152 includes vacuum openings 158 which convert the mold part into a vacuum mold 152.

The vacuum mold 152 includes a mold surface 160 which is shaped to define the configuration of the upper exterior surface of the seat panel 146. It can be seen that the cover 144 can be simply extending onto the mold surface 160 and the peripheral mold part 154 engaged along the periphery of the seat cover panel periphery. Thereafter, the vacuum is applied to conform the shape of the panel portion 146 to the shape of the mold surface 160. As before, foamable expandable material is provided onto the upwardly facing interior surface of the seat panel 146 within the peripheral mold part 154 and thereafter the upper mold part 156 is moved into engagement to complete the assembly of the components of the mold assembly 151.

In this regard, it will be noted that the upper mold part 156 includes the venting assembly 74, the sensing and signal generating assembly 75, and a sealing mechanism 81 all constructed as before and operating as previously stated.

For purposes of completing the present disclosure, the disclosure of all of the above-identified applications and patents are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A device for molding a foam product comprising:

a plurality of mold portions cooperable to form a foam mold assembly defining a mold cavity therein, having at least one vent hole in an upper portion thereof, said mold cavity being capable of having an expandable foamable material provided therein during a filling cycle which is reactively expanded within said mold cavity so as to be molded into a shape of said mold cavity during a foaming cycle, said expandable foamable material approaching said vent hole while expanding within said mold cavity during said foaming cycle, said at least one vent hole providing a passage through which air and reaction product gases introduced into said mold cavity as a byproduct of said reactive expanding of said expandable foamable material can escape to atmosphere from said mold cavity during said foaming cycle;

a sensing and signal generating assembly comprising a capacitive sensor in communication with said expandable foamable material and constructed and arranged for detection of a change in a dielectric characteristic within the mold cavity at a distance to said at least one vent hole as a result of said expandable foamable material approaching said at least one vent hole and to generate a signal in response to said detection; and a sealing mechanism cooperable with said at least one vent hole constructed and arranged to close said passage when said sensing and signal generating assembly generates said signal in response to said detection of said expandable foamable material at said distance to said at least one vent hole to prevent said expandable foamable material approaching said at least one vent hole from escaping said mold cavity through said passage.

2. The device as claimed in claim 1 wherein said sealing mechanism comprises a seal cap threadedly secured to the capacitive sensor, said seal cap being cooperable with said at least one vent hole to sealingly plug said at least one vent hole when the sensing and signal generating assembly generates said signal in response to the detection of said expandable foamable material at said distance to said at least one vent hole to prevent the expandable foamable material approaching said at least one vent hole from escaping the mold cavity through said passage.

3. The device as claimed in claim 2 wherein said sealing mechanism further includes a biasing spring for urging the seal cap towards said at least one vent hole to seal said at least one vent hole when said sensing and signal generating assembly generates said signal in response to the detection of the expandable foamable material at said distance to said at least one vent hole to prevent said expandable foamable material approaching said at least one vent hole from escaping said mold cavity through said passage.

4. The device as claimed in claim 3 wherein said biasing spring comprises a single coil spring.

5. The device as claimed in claim 4 wherein said single coil spring extends to move the seal cap towards said at least one vent hole to seal said at least one vent hole when said sensing and signal generating assembly generates said signal, said signal coil spring being maintained in a compressed condition before said sensing and signal generating assembly generates said signal to prevent said sealing mechanism from closing said passage so that said air and reaction product gasses introduced into the mold cavity as a byproduct of said reactive expanding of said expandable foamable material can escape to atmosphere from said mold cavity during said foaming cycle.

6. The device as claimed in claim 5 wherein said sealing mechanism includes an upper portion disposed within an air space formed within a main housing block, a piston within said air space, said piston being cooperable with the upper portion of said sealing mechanism to maintain said coil spring in said compressed condition when a sufficient amount of air pressure is provided in said air space to compress said coil spring; and an air pressure source constructed and arranged to provide said air pressure to said air space, said air pressure from said air source acting on said piston so that said piston cooperates with said sealing mechanism to maintain said coil spring in said compressed condition, before said sensing and signal generating assembly generates said signal, to prevent said sealing mechanism from closing said passage in order to allow said air and reaction product gasses introduced into said cavity as a byproduct of said reactive expanding of said expandable foamable material to escape to atmosphere from said mold cavity during said foaming cycle.

7. The device as claimed in claim 6 wherein said signal generated by said sensing and signal generating assembly operates to prevent said air pressure source from providing said air pressure to said air space so that said piston does not maintain said coil spring in said compressed condition and so that said sealing mechanism is permitted to cooperate with said at least one vent hole to close said passage.

8. The device as claimed in claim 1 wherein said mold cavity is constructed and arranged to receive expandable foamable material in the form of a polyurethane foam material having a percentage of water content, and wherein said sensing and signal generating assembly detects said change in said dielectric characteristic within said mold cavity as a result of said water content in said polyurethane foam material approaching said capacitive sensor.

9. The device as claimed in claim 1 wherein said plurality of mold portions includes a mold tongue structure which carries a design, said tongue structure being operable to receive an inverted bag of material having front and back panels with respective interior and exterior surfaces, said exterior surfaces being in contact with the tongue structure, said front panel of the bag of material being conformed with the design carried by the tongue, said expandable foamable material coming into contact with and adhering to the interior surface of the front panel when said expandable foamable material is provided in the mold cavity to provide the front panel with a cushion body of said foamable material on the interior surface thereof.

10. The device as claimed in claim 9 wherein the tongue carries apertures through which a vacuum can be applied to draw the exterior surface of the bag of material into said contact with the tongue so that said front panel of the bag of material is conformed with the design carried by the tongue.

11. The device as claimed in claim 1 wherein said foam product comprises a bag material used in forming a seat back component, said bag material including front and back seat back panels interconnected along one end and opposite sides and open along an opposite end, said device further comprising:

a tongue structure of a size and shape to extend within the bag material through the open opposite end thereof, said tongue structure having a mold surface of a shape operable when the bag material is mounted in inside-out relation over the tongue structure into an operative position to be confronted by an outside surface of the front seat back panel of the bag material, said plurality of mold portions including an upper mold portion and a lower mold portion, said lower mold portion and said tongue structure being mounted for relative movement with respect to one another between (1) a mounting and dismounting position wherein the tongue is supported in cantilevered fashion by the lower mold portion so as to accommodate the mounting of the bag material in inside-out relation over the tongue structure into said operable position and subsequent dismounting therefrom, and (2) a molding position wherein said tongue structure is supported by said lower mold portion through the back seat back panel of said bag material, said plurality of mold portions including a side wall mold structure mounted with respect to said tongue structure for relative movement between (1) an inoperative position enabling said bag material to be mounted in said operative position with respect to said tongue structure and to be dismounted therefrom and (2) an operative position wherein said side wall mold structure extends from an inside surface of the front seat back panel along a periphery thereof, means including apertures extending to the mold surface of the tongue structure for creating vacuum pressure conditions between said mold surface and the front seat back panel of the bag material while said side wall mold structure is in said operative position sufficient to conform the outside surface of the front seat back panel confronting the mold surface to the shape thereof, and said upper mold portion being mounted for relative movement with respect to the side wall mold structure into an operative position wherein the upper mold portion cooperates with the side wall mold structure and the inside surface of a front seat back panel having its outside surface conforming in shape to the shape of the mold surface of the tongue structure to define said mold cavity in which the expandable foamable material is foamed in adhered relation to the inside surface of the front seat back panel of the bag material.

\* \* \* \* \*